United States Patent [19]
Nakamura

[11] 4,254,986
[45] Mar. 10, 1981

[54] MULTI-PIECE ROOF FINISHER FOR A VEHICLE

[75] Inventor: Yoshiharu Nakamura, Koganei, Japan

[73] Assignee: Nissan Motor Company, Limited, Japan

[21] Appl. No.: 47,290

[22] Filed: Jun. 11, 1979

[30] Foreign Application Priority Data

Sep. 12, 1978 [JP] Japan .............................. 53-125958[U]

[51] Int. Cl.³ .............................................. B62D 25/06
[52] U.S. Cl. ....................................... 296/210; 296/29
[58] Field of Search ............ 296/137 R, 137 B, 137 C, 296/29, 196

[56] References Cited
U.S. PATENT DOCUMENTS 4,184,713  1/1980  Matsui .............................. 296/137 R Primary Examiner—John J. Love
Assistant Examiner—John A. Carroll
Attorney, Agent, or Firm—Lane, Aitken, Ziems, Kice & Kananen

[57] ABSTRACT

An improved multipiece roof finisher, mounted over a roof and both side pillars of a vehicle, is disclosed. The finisher is divided into three parts: a center finisher over the roof, and two side finishers which cover the side pillars. The center finisher is connected to the side finishers by connecting means.

2 Claims, 6 Drawing Figures

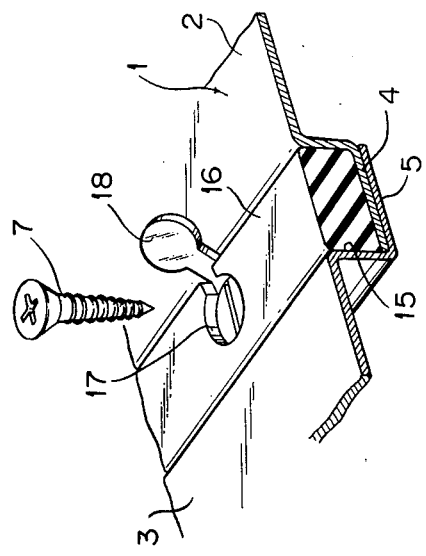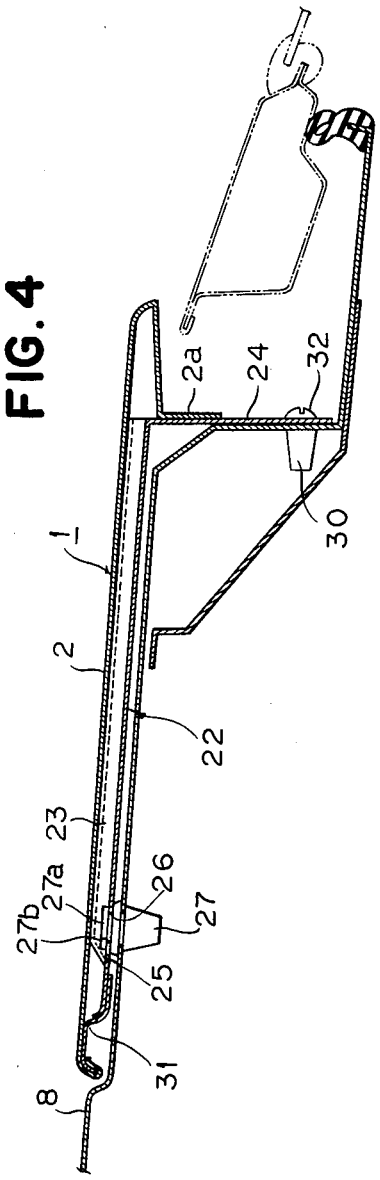

MULTI-PIECE ROOF FINISHER FOR A VEHICLE

BACKGROUND OF THE INVENTION

The present invention relates to a roof finisher which is mounted over a roof and the two side pillars of a vehicle, such as an automobile.

It is known to install a roof finisher over the roof of a vehicle from one side to the other, wherein the finisher also covers both side pillars of the vehicle. Normally this kind of roof finisher is formed as one piece, and this one piece covers the side pillars as well as the rear portion of the roof. This means that the finisher is large, bulky, and heavy, and accordingly it is difficult to handle, and difficult for one man to install in place on the vehicle.

SUMMARY OF THE INVENTION

It is therefore an object of the present invention to provide a roof finisher for a vehicle which is easier to handle and to install than prior art roof finishers.

It is a further object of the present invention to provide a roof finisher of which individual parts can be replaced, in the event of damage, without replacing the whole finisher.

It is yet another object of the present invention to provide a roof finisher which can be readily adapted to various color schemes more conveniently than prior art finishers.

It is yet a further object of the present invention to provide a roof finisher for a vehicle in which water leakage into the vehicle passenger compartment is positively prevented.

According to the present invention, these and other objects are attained by a roof finisher mounted over a roof panel and both side pillars of a vehicle, comprising a center finisher mounted across the roof panel from its one side to its other side, two side finishers mounted one on each side pillar of the vehicle, and two connecting means, each of which connects a side edge of the center finisher with the upper edge of one of the side finishers.

Thus, the finisher is divided into three parts: a roof or center finisher, and two side finishers, which cover the side rear pillars of the vehicle. These finishers are joined by connecting means at the upper edges of the side pillars.

BRIEF DESCRIPTION OF THE DRAWINGS

Other objects, features, and advantages of the present invention will become more apparent from the following detailed description of a preferred embodiment thereof, when taken in conjunction with the accompanying drawings, which are however given for the purposes of illustration only, and are not to be taken as in any way limitative of the present invention, whose scope is to be determined solely by the appended claims. In these drawings, like reference numbers denote like parts, and:

FIG. 3 is a perspective view, partly in cross-section, showing the mode in which a garnish may be fitted to the roof finisher of FIGS. 1 and 2;

FIG. 4 is an enlarged section, taken along the line IV—IV in FIG. 1;

DESCRIPTION OF THE PREFERRED EMBODIMENT

Figure 1:
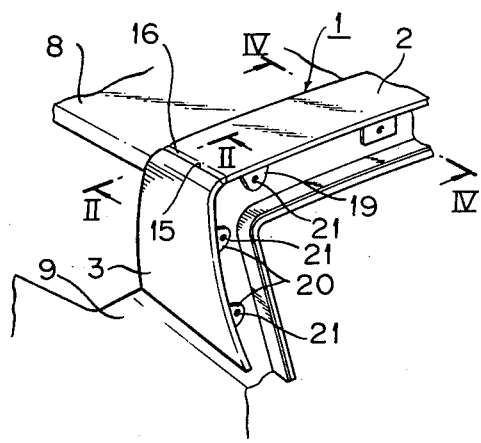
FIG. 1 is a perspective view of one side of a roof finisher which is an embodiment of the present invention, mounted on a vehicle over the roof and the side pillar thereof.
Figure 2:
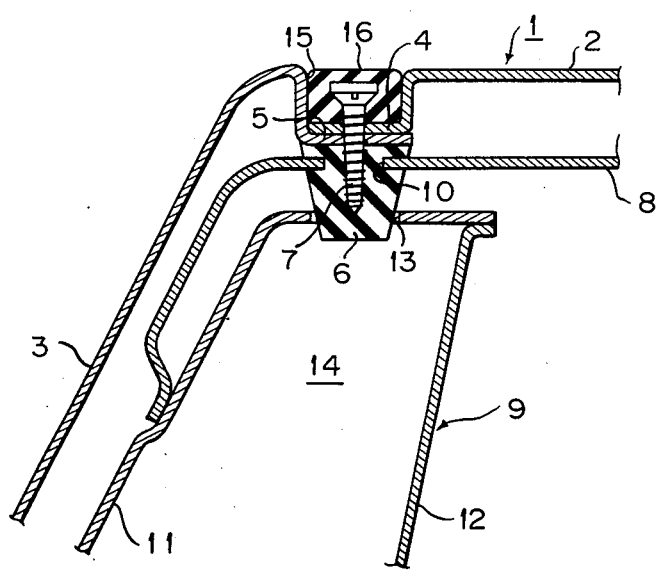
FIG. 2 is an enlarged section, taken substantially along the line II—II in FIG. 1.

Referring to the FIGURES, a roof finisher generally designated by 1 is divided into three basic parts: a center finisher 2 which is disposed on the roof panel 8 of a vehicle, and two side finishers 3, of which only one is shown, disposed on the rear side pillars 9 on the two sides of the vehicle. The center finisher 2 extends across the roof of the vehicle from its one side to its other side, and its side edges are formed with coupling or connecting flanges 4. Similarly, the upper edges of the side finishers 3 are formed with flanges 5. These flanges are placed one over the other (in this embodiment, the flange 4 is placed over the flange 5), and they are joined together and joined to the roof panel 8 by means of screw grommets 6, which fit through holes drilled in the roof panel 8. Screws 7 are screwed into the screw grommets 6, and these screws hold the flanges 4 and 5 to the grommets 6. Because the grommets 6 are expanded somewhat by the screws 7, they are more firmly held in the holes drilled in the roof panel 8.

Further, the tips of the screw grommets 6 protrude somewhat into a space 14 formed between the rear pillar outer panel 11 and the rear pillar inner panel 12, each through an opening 13 with a space being left therebetween, said opening 13 being formed on the upper portion of the rear pillar outer panel 11. Thus, if by any chance water, such as from rain, should penetrate between the flanges 4 and 5, which should be properly sealed together by the grommets 6, this water will drip down the grommets 6 and be directed into the space 14, and thus it will be positively prevented from entering the vehicle passenger compartment. This water will in fact be discharged by trickling along the outer surface of the inner panel 12.

In the illustrated embodiment, only one grommet 6 is provided to join the flanges 4 and 5. Of course, any plurality of grommets may also be used.

Further, in the illustrated embodiment, because the general level of the flanges 4 and 5 is below the level of the roof finisher 1 and a side finisher 3 where they are joined, due to the stepping of the flanges 4 and 5, a garnish 16 is provided in the groove 15 so as to fill the groove so that it is flush with the surfaces of the respectively joined finishers. As best seen in FIG. 3, the garnish 16 has a countersunk portion 17 which receives the head of the screw 7, and further is integrally provided with a cover 18 which can be used to cover the screw 7, when this screw has been driven home. This provides a neat appearance.

Figure 5:
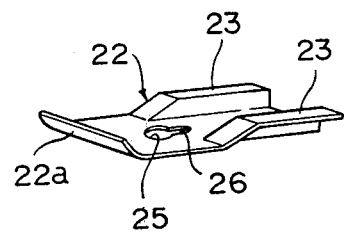
FIG. 5 is a perspective view, illustrating a front portion of a stiffener.
Figure 6:
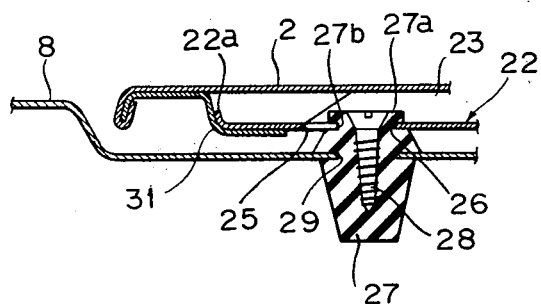
FIG. 6 is an enlarged view of the portion of FIG. 4 which is encircled.

Further details of the construction are as follows. The rear edges of the center finisher 2 and of the side finishers 3 are coupled with the rear edge of the roof panel 8 and the rear edges of the rear pillars 9 by means of locking members 19 and 20 respectively, using the grommets 21. As shown in FIGS. 4, 5, and 6, a stiffener 22 is attached approximately at the center of the center finisher 2 in order to prevent it from coming loose. On the two side edges of the stiffener 22 supporting the center finisher 2 are formed raised flanges 23. Further, a locking member 24 which locks with the rear edge of the roof panel 8 is formed by bending down the rear end portion of the stiffener 22. Towards the front end of the stiffener 22 are formed a hole 25 which is for receiving the head 27a of the screw grommet 27, and a slot to lock with the neck 27b of the grommet 27. The grommet 27 is fitted into a hole 29 in the roof panel 8. The screw 28 is then screwed into the hole of the grommet 27, and then the head 27a of the grommet 27 is inserted into the hole 25. Then the stiffener 22 is slid forward until the locking member 24 abuts the rear edge of the roof panel 8, and thereby the neck 27b of the grommet 27 is tightly engaged with the slit 26. The locking member 24 now is in register with a screw grommet 30 which has been fitted into the rear edge of the roof panel 8, and these two are now connected together by a screw 32. Thus the stiffener 22 is firmly mounted on the roof panel 8.

Currently, the bracket 31 fastened on the front edge portion of the finisher 2 has engaged with the front edge 22a of the stiffener 22. As may be seen in FIG. 4, a flange 2a formed in a folded form on the rear edge of the center finisher 2 is connected with the locking member 24 of the stiffener 22 by welding or the like.

Because the roof finisher according to the present invention is formed in three parts, which can be mounted to the vehicle separately, its handling and fitting are much easier than in the case of prior art finishers. Further, if part of the present finisher is damaged while the vehicle is being used, this part only can be replaced, and thus the rest of the finisher need not be changed. This is economical. Further, because the side finishers and the center finisher are separate, it is much easier to provide a wide range of color schemes for vehicles, if the side finishers are to differ in color from the center finisher.

Although the present invention has been shown and described in terms of a preferred embodiment thereof, it should be understood that various changes and modifications of the form and the content thereof may be made by one skilled in the art without departing from the scope of the invention, which is therefore to be defined solely by the claims, which follow.

What is claimed is:

1. A roof finisher mounted over a roof panel and both side pillars of a vehicle, comprising:
    a center finisher mounted across the roof panel from its one side to its other side;
    two side finishers mounted one on each side pillar of the vehicle; and
    two connecting means, each of which connects a side edge of the center finisher with the upper edge of one of the side finishers, the connecting means each comprising a flange at a side edge of the center finisher, a flange at the upper edge of one of the side finishers, the flanges being placed one over the other, and at least one screw grommet, by means of which the flanges are fixed on the roof panel and are connected together, the tip of each of the screw grommets protruding into a space formed between an outer panel and an inner panel which together constitute a pillar located near the underside of the roof panel, the screw grommet being inserted through an opening formed on the upper portion of the pillar with a space being left therebetween.

2. The roof finisher of claim 1, wherein the connecting means is below the general level of the roof finisher and side finisher where it connects them, and where the level is brought up flush by a garnish.

* * * * *